United States Patent [19]

Springer

[11] Patent Number: 4,984,118
[45] Date of Patent: Jan. 8, 1991

[54] FLUX-CONCENTRATING, NON-GHOSTING ELECTROMAGNETIC READ/WRITE HEAD

[75] Inventor: Gilbert D. Springer, Fremont, Calif.

[73] Assignee: Springer Technologies, Fremont, Calif.

[21] Appl. No.: 294,351

[22] Filed: Jan. 9, 1989

[51] Int. Cl.$^5$ .................. G11B 5/187; G11B 5/23; G11B 5/127

[52] U.S. Cl. .................. 360/125; 360/119; 360/122

[58] Field of Search .................. 360/122, 125, 126, 119

[56] References Cited

U.S. PATENT DOCUMENTS

| | | | |
|---|---|---|---|
| 4,758,916 | 7/1988 | Niwa et al. | 360/122 |
| 4,774,616 | 9/1988 | Kumasaka et al. | 360/122 |
| 4,866,555 | 9/1989 | Inagoya et al. | 360/126 |

*Primary Examiner*—Robert S. Tupper
*Attorney, Agent, or Firm*—Kolisch, Hartwell & Dickinson

[57] ABSTRACT

An electromagnetic read/write head structure for longitudinal/horizontal reading and writing including first and second magnetic pole components which are spaced by a substantially uniform-width, linear, planar gap. Each pole component is characterized by a configuration, measured generally in the plane of the gap, where no portions of the outlines of the pole components, save those portions which actually define the gap, include any stretch extending parallel to the gap.

3 Claims, 1 Drawing Sheet

FLUX-CONCENTRATING, NON-GHOSTING ELECTROMAGNETIC READ/WRITE HEAD

BACKGROUND AND SUMMARY OF THE INVENTION

The present invention relates to longitudinal/horizontal magnetic recording apparatus, and more particularly, to an electromagnetic read/write head, or head structure, for the longitudinal/horizontal writing and reading of magnetic images with respect to a relatively moving magnetic recording medium, such as a magnetic recording disk.

In the prior-art world of longitudinal/horizontal magnetic recording, error problems have existed that result from the read/write head geometries which have been employed. More particularly, in prior-art heads, for example in thin-film heads, in addition to the two, linear, confronting, parallel pole edges which define the "operative" read/write gap, other edges in the pole components forming a head structure, even though somewhat remote from the operative gap edges, nevertheless parallel these gap edges, and are the distressing culprits. These remote but parallel other edges can, and do, exhibit what might be thought of as a "ghosting" behavior—the writing of unwanted, error-generating images on a medium, and the reading of normal images in a manner producing a false read-data stream.

A principal object of the present invention, in this setting, is to provide a revolutionary longitudinal/horizontal recording head-structure design having, to the best of my knowledge, no similarity to any prior-art head, and clearly having a geometric configuration which avoids the ghosting problems just mentioned.

Eliminating such other parallel edges is the focus, and the special accomplishment, of the head proposed by the present invention. Such elimination is achieved by a remarkable head pole-construction in which the only edges capable of creating (writing), and reading, longitudinally/horizontally oriented recorded images are the two edges that define a read/write gap in the head.

Outlining, in very broad terms, the unique geometric, and hence magnetic, characteristics of the proposed head, the same includes first and second magnetic pole components which are spaced by a substantially uniform-width linear planar gap. These pole components are each characterized by a configuration, measured generally in the "plane" of the gap, where no portion of the outline of a pole component, save that edge portion which define a side of the gap, includes any part which extends parallel to the gap-defining edge.

According to a preferred embodiment of the invention, the first pole component has a read/write face, lying in the plane just referred to, which face has a somewhat triangular outline, terminating at one end in a "point", and at the other end in a linear edge which defines one side of the read/write gap. The second pole component includes a read/write face lying in the same plane, which face terminates at one end in a linear edge that faces and substantially parallels the edge just mentioned in the first pole component, cooperating therewith to define the opposite side of the gap, with this second pole component's read/write face flaring away from the gap-defining edge with what might be thought of as a somewhat horn-like configuration. This "flaring-away" portion of the second pole component joins homogeneously with another portion which eventually shrinks in dimension to a "point".

This general outline of the proposed head of this invention, when read along with the detailed description and drawings forming part of this disclosure, describes a unique longitudinal/horizontal read/write electromagnetic head, wherein it is only in the region of the two, confronting, parallel, gap-defining edges that longitudinal (horizontal) reading and writing can occur. The problem of "ghosting", accordingly, is substantially completely eliminated.

Those skilled in the art will recognize, from the description which now follows, that many conventional materials and fabrication techniques, may be used to implement the head of the present invention. Certain materials, which I consider to be preferred, are described herein. Also, certain fabrication techniques, which I know to work well, are generally set forth. In connection with the latter, the reader may wish to review the disclosure found in my prior-issued U.S. Pat. No. 4,414,554, issued Nov. 8, 1983 for "Magnetic Imaging Apparatus". This patent, although specifically focused on a very different kind of read/write head, nevertheless discusses, in some detail, fabrication techniques which are useful in the handling of the specific materials which I discuss below as being employed preferably in the head which is the subject matter of this invention. Because of this, I am incorporating herein, by reference, the entirety of that patent's disclosure.

Achievement of the anti-ghosting objective outlined above, and various other features and advantages which distinguish and make special the head structure proposed by this invention, will become more fully apparent as the description which now follows is read in conjunction with the accompanying drawings.

DETAILED DESCRIPTION OF THE INVENTION

Figure 1:
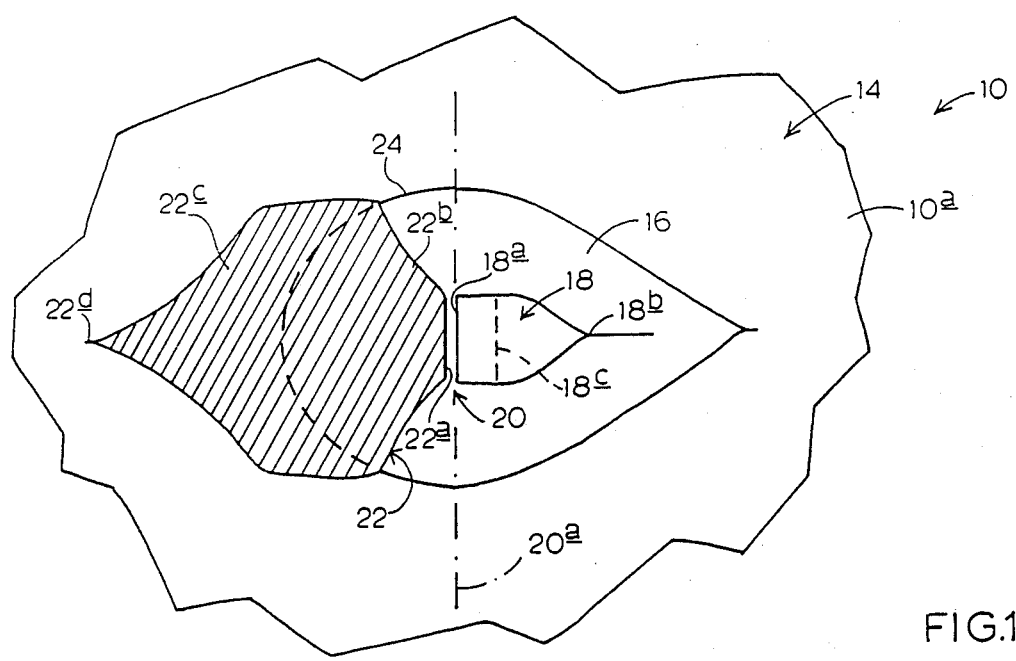
FIG. 1 is a fragmentary plan view illustrating an electromagnetic, longitudinal/horizontal, read/write head structure constructed in accordance with the present invention.

Turning attention now to the two drawing figures, indicated generally at 10 is an electromagnetic read/write head, or head structure, for longitudinal/horizontal reading and writing of magnetic images with respect to a relatively moving magnetic recording medium (not shown). The substantially planar face, 10a, which, during operation of head 10, faces a magnetic recording medium, lies in a plane 12 which is referred to herein as a substantially common plane. Plane 12 is normal to the plane of FIG. 2, and is the same as the plane of FIG. 1.

The foundation structure for head 10 herein takes the form of a thin web of high-permeability magnetic/electrically conductive material known as Metglas. Two Metglas materials which have been found to be entirely satisfactory are manufactured by Allied Chemical Company, and are sold under the designations 2826 MB Metglas ($Fe_{40}$—$Ni_{38}Mo_4B_{18}$), and 2605 SE Metglas ($Fe_{81}B_{13.5}Si_{3.5}C_2$). This web, which is also referred to herein as a substrate, is shown at 14 in FIGS. 1 and 2. The upper face of substrate 14 in FIG. 1 (the face which confronts the viewer in FIG. 1), of course, lies in previously mentioned plane 12.

Suitably formed, as by a combination of ion-beam micromachining, and chemical wet-etching, in the upper region of substrate 16 are a shallow, somewhat circular cavity 16, projecting generally centrally from which is a protrusion, or island, referred to herein also as a first magnetic pole component 18.

Directing special attention now to important features of pole component 18, and looking especially at FIG. 1, this pole component is seen to have a generally triangular outline. This outline defines what is referred to herein as a read/write face in component 18. The left side of this face terminates in a linear edge 18a, which forms one side of a read/write gap 20 in head 10. The long axis of gap 20 is shown at 20a. The right side of this face terminates in a point 18b. Thus, it will be immediately apparent to those reading this disclosure that, in pole component 18, and within plane 12, there is no other perimeter portion of the read/write face in component 18 which has any stretch that parallels edge 18a. This is a very significant feature of this pole component in head 10.

Figure 2:
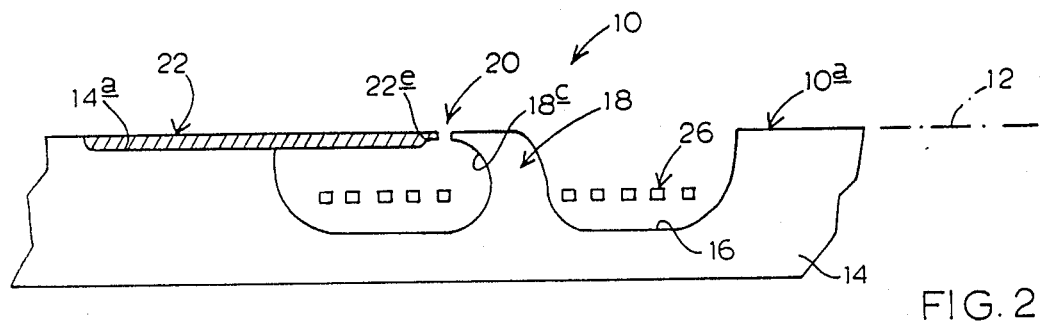
FIG. 2 is a fragmentary cross-sectional view taken generally along the line 2—2 in FIG. 1.

Still considering the configuration of pole component 18, and addressing attention particularly now to FIG. 2, the wet-chemical etching procedure, a conventional type of procedure, employed during manufacture of cavity 16 and pole component 18, results in that portion of the pole component which immediately underlies the read/write face being underbeveled. This under-beveling condition is shown at 18c in the figures. The importance of this detail will be explained shortly.

Also forming part of head 10 is a second magnetic pole component which is shown at 22 in the figures. Looking for a moment at this pole component as the same is illustrated in FIG. 1, shading has been used to help highlight the formation perimeter-outline of the component. This outline defines, as seen in FIG. 2, a read/write face in component 22. The right edge of this face terminates in a linear edge 22a which closely confronts edge 18a, in a parallel manner, to define the opposite side of read/write gap 20. Progressing to the left in FIG. 1 away from edge 22a, there is a region 22b in component 22 which flares outwardly away from the edge in what can be viewed as a generally horn-like manner. This outwardly flaring stretch in pole component 22 joins integrally and homogeneously with a second region 22c which, still progressing to the left in FIG. 1 away from edge 22a, holds its dimension for a short stretch, and then shrinks generally to a point 22d. The curved dashed line shown at 24 in FIG. 2 indicates what might be thought of as the dividing region between, or region of joinder of, regions 22b, 22c, and in fact, indicates a portion of the perimeter outline of cavity 16 which underlies pole component 22.

What was referred to earlier as the plane of the read/write gap, gap 20, is plane 12.

Still focusing attention on pole component 22, and looking now at FIG. 2 along with FIG. 1, this cross-sectional view of component 22 shows a stepped construction 22e in the region immediately adjacent gap 20. Progressing away from the gap, the cross-sectional thickness of pole component 22 is stepped in an increasing-thickness manner, as is shown in FIG. 2. Preferably, the thickness of the cross section "before" the step is about 1-micron, and immediately "after" the step about 2-microns. Pole region 22c is in direct magnetic contact with substrate 14, lying on what might be thought of as a shelf 14a which has been suitably formed to the appropriate shape shown.

Pole component 22 is made of a conventional high-permeability magnetic material, such as permalloy, and is built into the head structure employing any one or more of a wide variety of well-known manufacturing procedures.

As can be seen from looking at the outline of the read/write face in pole component 22, as shown in FIG. 1, no part of the perimeter outline of this face, other than edge 22a, lies parallel to the long axis 20a of gap 20. Significantly, pole component 22, on its side away from edge 22a, does not terminate in coincidence with dashed line 24. Were it to do so, clearly there would be another edge portion in component 22 generally parallel to gap axis 20a. Such an edge portion could cause "ghosting".

There is thus a situation wherein, within head 10, the only two edges which parallel one another in plane 12 are edges 18a and 22a—those edges being the ones defining the operative read/write gap.

Completing a description of head structure 10, formed in a conventional manner in a supporting bed of photoresist or polyamide, or the like, within cavity 16 is an electrically conductive coil, or coil means, 26. This coil, which may be prepared from a deposit of copper, takes the form herein of a single-layer, 12-turn coil, the opposite ends of which connect to the "outside world" via suitable conductive feeders. Gap 20 is filled conventionally with aluminum oxide.

Gap 20 is filled conventionally with a suitable non-magnetic, non-conductive, non-corrosive material such as glass, aluminum oxide, titanium, etc.

It should thus be apparent to those skilled in the art that operation of head 10 will result, substantially, in the complete elimination of the annoying, and error-producing, ghosting problems mentioned earlier. The special and unique configurations of pole components 18, 22 dictate this result.

A further advantage of head 10 results from the underbevel in pole component 18 and from the stepped construction (near gap 20) in pole component 22. More particularly, what results is that, as these two pole components are seen in cross section in FIG. 2, they have thin-depth (narrowed) vertical dimensions which tend to focus and concentrate flux in the important operating region of the head —gap 20. As a consequence, during a writing operation there is a high flux density at the gap which results in clearly written, intense magnetic images.

Thus, the important operational advantages of head structure 10 should be apparent.

As was suggested earlier, conventional materials other than those which have been mentioned herein specifically can be used to form a read/write head structure for longitudinal (horizontal) recording in accordance with the invention. Also, manufacturing and fabrication techniques other than those described and suggested herein, can be employed as is deemed most appropriate. For example, while cavity 16 and pole component 14 have been described herein formed in the material known as Metglas, the same kind of structure could be formed in a non-magnetic substrate which is later coated with a suitable magnetically permeable material.

Thus, a preferred embodiment of the invention has been illustrated and described herein. Variations and modifications, I recognize, are certainly possible, and may be made without departing from the spirit of the invention.

It is claimed and desired to secure by letters patent:

1. An electromagnetic read/write head structure for longitudinal/horizontal reading and writing comprising
   first and second magnetic pole components spaced by a substantially uniform-width, linear, elongate, planar gap, said pole components each being characterized by a configuration, measured generally in the plane of said gap, where no portions of the outlines of the pole components, save those portions which define said gap, include any portion extending parallel to the gap,
   one of said first and second components having a cross-sectional configuration, as viewed in plane substantially normal both to the plane of and to the long axis of said gap, which, progressing away from the gap, is defined by a stepped construction that increases in thickness, and the other of said components, as similarly viewed, is underbeveled relative to the plane of the gap.

2. An electromagnetic read/write head structure for longitudinal/horizontal reading and writing comprising
   first and second elongate magnetic pole components having read/write faces lying in a substantially common plane, with the face in said first component terminating at one end in a point and at the other end in a linear edge defining one side of a read/write gap, and the face in said second component terminating at one end in a linear edge facing and substantially paralleling said first-mentioned edge and defining therewith the opposite side of said gap and flaring therefrom away from said gap,
   one of said first and second components having a cross-sectional configuration, as viewed in a plane substantially normal both to said common plane and to the long axis of said gap, which, progressing away from the gap, is defined by a stepped construction that increases in thickness, and the other of said components, as similarly viewed, is under-beveled relative to the common plane, and
   coil means operatively coupled to said pole components.

3. An electromagnetic read/write head structure for longitudinal/horizontal reading and writing comprising
   a planar magnetic substrate having one face and including a somewhat bowl-like cavity extending thereinto from said one face, and a first magnetic pole component projecting generally centrally from the base of said cavity toward and substantially to the plane of said one face, said first pole component, as viewed along a line normal to the plane of said one face, having a substantially linear read/write edge, and a dimension, measured generally parallel to said edge, and progressingly downstream from said edge, which diminishes in size generally to a point,
   a second magnetic pole component formed within said cavity in magnetic contact with said substrate coupled to said first pole component via a substantially linear edge which forms, with said first-mentioned edge, a substantially uniform-width gap in the plane of said one face, said second pole component, as viewed generally along the line mentioned above, having a dimension, progressing upstream from its said edge, which, in a first stretch, expands in size, and thereafter in a second stretch shrinks in size generally to a point, and
   coil means operatively coupled to said two pole components.

* * * * *